UNITED STATES PATENT OFFICE 2,192,271

AZO DYESTUFFS

Henry Mirocourt, Sotteville-les-Rouen, and Marcel Georges Jirou, Rouen, France, assignors to Compagnie Nationale de Matières Colorantes et Manufactures de Produits Chimiques du Nord Réunies, Etablissements Kuhlmann, Paris, France, a corporation of France No Drawing. Application July 15, 1938, Serial No. 219,428. In France August 20, 1937

2 Claims. (Cl. 260—155)

It has been found in accordance with the present invention that it is possible to obtain new azo dyestuffs by coupling with any one of the usual coupling components containing sulphonic groups (such components are for instance alpha or beta naphthol mono- or poly-sulphonic acids, hydroxy-carbazol sulphonic acids, hydroxy-quinoleine sulphonic acids, aminonaphthol mono- or disulphonic acids and also their N- substituted derivatives, the sulphonic compounds of the group of pyrazolones and their substituted derivatives), the diazo compounds obtained from aromatic amines of the general formula:

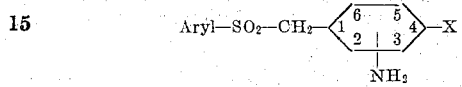

in which X stands for a halogen or an alkyl or alkoxy group and in which the group $NH_2$ can occupy the position 2 or 3.

The amines of the above formula can be obtained by condensing the substituted derivatives of benzyl chloride with aromatic sulphinic acids, nitrating and reducing the benzyl sulphones obtained.

It is also possible to produce them by condensing a nitrated and substituted derivative of benzyl chloride (see Bull. Soc. Ch. (I) 1934, p. 538 R. Quelet) with sulphinic acids; there is then obtained directly the nitrobenzyl sulphone derivative which it suffices to reduce by the known methods.

The azo dyestuffs obtained according to the process of the present invention possess in general good fastness properties, particularly to light and to sea water and also good levelling properties. In addition several dye silk from a neutral bath and reserve well cotton and acetate artificial silk.

The following examples illustrate the invention without limiting the same thereto.

Example 1

Preparation of 3-amino-4-methoxy-1-benzyl-4'-methylphenyl sulphone.

In 1500 litres of methyl alcohol are dissolved by heating under reflux 93 kgs. of the sodium salt of paratoluene sulphinic acid, then there are gradually added thereto within one hour 101 kgs. of 3-nitro-4-methoxy-benzyl chloride; after some hours heating the condensation is complete. The whole is allowed to cool to ordinary temperature. The condensation product crystallises. It is filtered and thoroughly washed with water and dried. There are obtained 133 kgs. of 3-nitro-4-methoxy-1-benzyl-4'-methylphenyl sulphone (85% of the theory) the melting point of which is 162° C.

160.5 kgs. of 3-nitro-4-methoxy-1-benzyl-4'-methylphenyl sulphone are gradually added to a reducing mixture consisting of: 300 litres of water, 250 kgs. of iron and 5 kgs. of 40% acetic acid to which have been added 300 litres of monochlorobenzene, heated to 95° C. When the reduction is complete the iron is precipitated by adding sodium carbonate, the mass is filtered and the iron sludge is washed with 200 litres of monochlorobenzene.

The filtration liquors are removed by steam; when chlorobenzene no longer passes over, the liquid is cooled and the well defined crystalline base filtered. There are obtained in the dry state 129 kgs. of a product melting at 152° C. Yield 89%.

Example 2

29.1 kgs. of the base 3-amino-4-methoxy-1-benzyl-4'-methyl-phenylsulphone (M. P. 152° C.) are dissolved in 400 litres of water and 35 kgs. of hydrochloric acid and the whole is diazotised at 0° C. with 7 kgs. of sodium nitrite; stirring is continued for one hour. There should finally exist a slight nitrous acid reaction. The diazo solution is then caused to flow within 30 minutes into a solution of 32 kgs. of 1-2 (2'-chloro-5'-sulphophenyl)-3-methyl-5-pyrazolone dissolved in 600 litres of water containing 30 kgs. of sodium carbonate.

The dyestuff formed is separated by the addition of salt, pressed and dried.

In the dry state the product obtained constitutes a yellow powder easily soluble in cold water with a bright yellow colour. It dissolves in concentrated sulphuric acid with an orange colour. The dyestuff dyes wool in an acid bath to a very deep yellow shade possessing an excellent levelling power. The dyeings are very fast to sea water, perspiration, sponging and light.

The dyestuff likewise dyes silk from a neutral bath and reserves well cotton and acetate artificial silk.

Example 3

The diazo solution prepared as in Example 2 is caused to flow into a bath containing 36 kgs. of the disodic salt of 1-naphthol-3,6-disulphonic acid dissolved in 500 litres of water and 25 kgs. of sodium carbonate.

The whole is stirred for some hours and then after heating to 80° C. and cooling to 35° C. the dyestuff which is difficultly soluble under these conditions is separated; it is pressed and dried.

In this state the dyestuff obtained constitutes a red powder of good solubility in water with a bright red colour. The colouration in concentrated sulphuric acid is bluish violet.

The dyestuff dyes wool to a bright red shade of excellent fastness properties; on the other hand it has little affinity for silk in a neutral bath and cotton and acetate artificial silk are perfectly reserved.

Example 4

By replacing in Example 3 the 1-naphthol-3,6-disulphonic acid by the corresponding quantity af 1-naphthol-3,8-disulphonic acid there is obtained a dyestuff which, after separation and drying, exists in the form of a brownish red powder dissolving in sulphuric acid with a violet colour and in water with a bright yellowish red.

It dyes wool to very bright yellowish red shades which possess fastness properties equal to those of the dyestuff of Example 3.

Example 5

29.1 kgs. of the base 3-amino-4-methoxy-1-benzyl-4'-methyl-phenyl sulphone (M. P. 152° C.) are diazotised as described in Example 2 and coupled with 54 kgs. of the disodic salt of 1,N-paratolyl-sulpho-8-hydroxynaphthalene-3,6-disulphonic acid in solution in 400 litres of water containing 25 kgs. of sodium carbonate. When the coupling is complete the dyestuff is separated by neutralisation of the reaction mixture with hydrochloric acid and finally with a little acetic acid. After filtration, pressing and drying it constitutes a dark red powder dissolving with a blue colour in concentrated sulphuric acid and with a bright violent red colour in water.

The dyestuff dyes wool to very bluish red shades of great brightness and possessing very good fastness properties. It reserves very well acetate artificial silk. It also possesses a strong affinity for silk in a neutral bath and the dyeings possess excellent fastness properties.

With 1-naphthol-4-sulphonic and 1-naphthol-5-sulphonic acids red shades are obtained, with 2-naphthol-6-sulphonic acid an orange shade, with 2-phenylamino-8-hydroxy-naphthalene-6-sulphonic acid a brown shade. All these dyestuffs possess good fastness properties.

What we claim is:

1. The azo dyestuffs of the following probable general formula:

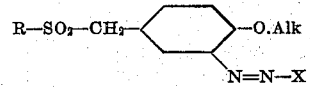

wherein R is a radicle of the benzene series not containing an OH group and X is a member of the group consisting of alpha naphthol monosulphonic acids, beta naphthol monosulphonic acids, alpha naphthol polysulphonic acids, beta naphthol polysulfonic acids, hydroxycarbazol sulphonic acids, hydroxy-quinoleine sulphonic acids, aminonaphthol mono- and disulphonic acids, and their N-aryl and N-arylsulphonyl derivatives, arylpyrazolone mono- and polysulphonic acids and their halogenated derivatives.

2. The method of preparing azo dyestuffs which consists in coupling a member of the group consisting of alpha naphthol monosulfonic acids, betanaphthol monosulphonic acids, alpha naphthol polysulfonic acids, beta naphthol polysulphonic acids, hydroxycarbazol sulphonic acids, hydroxy-quinoleine sulphonic acids, aminonaphthol mono- and disulphonic acids and their N-aryl and N-arylsulphonyl derivatives, arylpyrazolone mono- and polysulphonic acids and their halogenated derivatives, with diazo compounds obtained from bases of the following general formula:

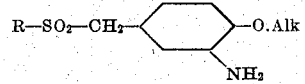

wherein R is a radicle of the benzene series not containing an OH group.

HENRY MIROCOURT.
MARCEL GEORGES JIROU.